United States Patent
Suzawa et al.

(10) Patent No.: US 7,296,419 B2
(45) Date of Patent: Nov. 20, 2007

(54) COOLING METHOD OF SUPERCONDUCTING CABLE LINE

(75) Inventors: Chizuru Suzawa, Osaka (JP); Takato Masuda, Osaka (JP); Kengo Ohkura, Osaka (JP); Yoshihisa Takahashi, Chiyoda-ku (JP); Shoichi Honjo, Chiyoda-ku (JP); Masato Shimodate, Chiyoda-ku (JP); Yoshibumi Sato, Chiyoda-ku (JP); Toshiyuki Uchiyama, Chiyoda-ku (JP)

(73) Assignees: Sumitomo Electric Industries, Ltd., Osaka (JP); The Tokyo Electric Power Company Incorporated, Tokyo (JP)

( * ) Notice: Subject to any disclaimer, the term of this patent is extended or adjusted under 35 U.S.C. 154(b) by 567 days.

(21) Appl. No.: 10/498,059

(22) PCT Filed: Mar. 31, 2003

(86) PCT No.: PCT/JP03/04135

§ 371 (c)(1),
(2), (4) Date: Jun. 9, 2004

(87) PCT Pub. No.: WO03/085682

PCT Pub. Date: Oct. 16, 2003

(65) Prior Publication Data

US 2005/0067174 A1   Mar. 31, 2005

(30) Foreign Application Priority Data

Apr. 5, 2002   (JP) .............................. 2002-104237

(51) Int. Cl.
*F25D 3/12* (2006.01)
*F25D 23/12* (2006.01)

(52) U.S. Cl. .......................................... 62/56; 62/259.2
(58) Field of Classification Search .................... 62/56, 62/118, 259.2, 50.4, 614, 616; 174/15.2, 174/15.4, 125, 174; 29/81, 599, 890
See application file for complete search history.

(56) References Cited

U.S. PATENT DOCUMENTS 2,852,597 A * 9/1958 Raydt et al. ................. 174/107

(Continued)

FOREIGN PATENT DOCUMENTS

DE         300 683 A7     7/1992

(Continued)

OTHER PUBLICATIONS

Office Action; Japanese Examiner for JP—2002-104237; mailing date: Apr. 10, 2007.

*Primary Examiner*—Mohammad M. Ali
(74) *Attorney, Agent, or Firm*—Foley & Lardner LLP

(57) ABSTRACT

To provide a cooling method of a superconducting cable line wherein moistures contained in the cable in the superconducting cable line after laid is removed before cooling, so that solidification of the moistures can be prevented from clogging of piping including a coolant flow channel and a return pipe. There is provided an inert gas generating vessel so that before the coolant is flown into the superconducting cable line 15, the inert gas is blown into the cable line from an inflow pipe 23 connected with a supply pipe 19' and is discharged from a discharge pipe 22 together with the gas. The inert gas is preheated by a heater 3 before feeding it into the cable line. The discharge pipe 22 connected with a discharge side B of the return pipe 19 is provided with a moisture measuring instrument 20 to measure a moisture content of the discharged gas.

11 Claims, 4 Drawing Sheets

U.S. PATENT DOCUMENTS

| | | | |
|---|---|---|---|
| 3,428,925 A * | 2/1969 | Bogner et al. | 335/216 |
| 3,890,700 A * | 6/1975 | Diepers et al. | 29/599 |
| 3,890,701 A * | 6/1975 | Diepers | 29/599 |
| 3,900,947 A * | 8/1975 | Diepers et al. | 29/599 |
| 4,020,274 A | 4/1977 | Dean | |
| 4,052,784 A * | 10/1977 | Diepers et al. | 29/599 |
| 4,347,401 A * | 8/1982 | Knudsen et al. | 174/14 R |
| 5,221,663 A * | 6/1993 | Assmann | 505/473 |
| 5,987,731 A * | 11/1999 | Yamazaki | 29/599 |
| 6,525,265 B1 * | 2/2003 | Leijon et al. | 174/15.5 |
| 6,553,646 B1 * | 4/2003 | de Rochemont | 29/599 |
| 6,822,363 B2 * | 11/2004 | Leijon | 310/196 |

FOREIGN PATENT DOCUMENTS

| | | |
|---|---|---|
| EP | 0304116 A1 * | 2/1989 |
| JP | 57-44863 A | 3/1982 |
| JP | 57-185609 A | 11/1982 |
| JP | 63-64014 B2 | 12/1988 |
| JP | 2892385 B2 | 2/1999 |
| JP | 2000-091116 | 3/2000 |

* cited by examiner

COOLING METHOD OF SUPERCONDUCTING CABLE LINE

TECHNICAL FIELD

The present invention relates to a cooling method of a superconducting cable line. More particularly, the present invention relates to a cooling method of a superconducting cable line for preventing solidification of moistures contained in insulating material of a superconducting cable line to prevent clogging of a flow channel with the coolant.

BACKGROUND ART

FIG. 2 is a structural drawing in section of an example of a cold-dielectric type superconducting cable having three twisted cores. FIG. 3 is a perspective view of a cable core.

The superconducting cable usually comprises twisted cable cores 101 contained in an interior thereof, a double insulation tube (a corrugated inner tube 103 and a corrugated outer tube 105) arranged at the outside of the cores 101, a protective covering outer sheath 106, and a thermal insulation 104 interposed between the both tubes 103, 105. The room between outer surfaces of the cable cores 101 and an inner surface of the corrugated inner tube 103 is a coolant (e.g. liquid nitrogen) flow channel 102.

Each cable core 101 comprises a hollow or solid former 107, a superconducting layer 108, a cold dielectric layer 109, a superconducting shield layer 110 and a protecting layer 111 formed of synthetic resin, which are arranged from the inside in this order. The dielectric layer 109 is usually in the form of kraft insulating paper or semisynthetic paper, including laminate insulating paper, such as polypropylene laminate paper (laminate insulating paper formed of polypropylene and kraft paper) (Brand name: PPLP), wound onto the superconducting layer.

FIG. 4 is a schematic diagram of a conventional superconducting cable line. FIG. 5 is an enlarged illustration of a part C of FIG. 4. The superconducting cable line 15 in which the superconducting cable constructed above is set is connected with pipes (a supply pipe 19' and a return pipe 19) at both ends thereof to form a loop therebetween. Also, the superconducting cable line 15 is provided, at an intermediate portion thereof, with a cooling device 16 to cool coolant such as liquid nitrogen. The superconducting cable line 15 is formed by the superconducting cables being joined together through a joining portion 15B and is provided, at both ends thereof, with three-phase branch boxes 15A, 15C, to branch the cable cores contained in the superconducting cable into three phases. The cable cores are connected with branch pipes 21, respectively. The branch pipes 21 are connected to the supply pipe 19' for supplying the coolant and the return pipe 19 for returning the coolant to the cooling device 16. The cooling device 16 is provided with a refrigerator 17 for cooling the coolant and a circulation pump 18 for circulating the coolant.

As shown in FIG. 5, the branch pipe 21 at the terminal end portion of the superconducting cable line comprises an outer tube 21A and an inner tube 21B between which a vacuum insulation layer 19B is disposed. Similarly, the return pipe 19 connected to the branch pipe 21 comprises an outer tube 19A and an inner tube 19C between which a vacuum insulation layer 19B is disposed.

A cooling method of this conventional superconducting cable line will be described with reference to the schematic diagram shown in FIG. 4.

When the superconducting cable line 15 is in its initial state of construction in which the superconducting cable is just set in the superconducting cable line 15, the coolant is not yet put in circulation through the flow channel 102 shown in FIG. 2 and the flow channel 102 is in the hollow state. When the superconducting cable line 15 is put into operation, the coolant is fed from the cooling device 16 to the flow channel 102. Outline arrows in FIG. 4 indicate a flowing direction of the coolant. As indicated by the outline arrows, during the operation of the superconducting cable line 15, the circulation cooling is repeatedly performed in a closed loop system of superconducting cable line 15→return pipe 19→cooling device 16 →supply pipe 19'→superconducting cable line 15. In this circulation cooling, the coolant works to cool the superconducting layer 108 and superconducting shield layer 110 of FIG. 3 and also contributes to electric insulation of the cable.

For some time after the beginning of cooling, the coolant cooling down the superconducting cable line 15 evaporates into gas to gradually lower the temperature of the cable line 15, while flowing along a longitudinal direction of the cable line 15. For example, when liquid nitrogen is used as the coolant, the liquid nitrogen gasifies for some time after the beginning of cooling, while flowing along the longitudinal direction of the cable line 15, to lower the temperature of the superconducting cable line of normal temperature down to the temperature of the liquid nitrogen (about −196° C.). The gas generated is discharged from a purged pipe 22 located at an intermediate portion of the return pipe 19 through a valve V4 opened.

As mentioned above, for some time after the beginning of cooling, the coolant in the superconducting cable line 15 is not impregnated into the dielectric layer 109 of the superconducting cable, so that the dielectric layer 109 is still in its initial state in which the insulating paper, such as the kraft insulating paper or the semisynthetic paper such as polypropylene laminate paper, is wound onto the superconducting layer. In the application of the insulating paper for the dielectric layer of an oil filled cable, the insulating paper is, in general, subjected to vacuum drying before applied to such a cable. This is because there is the possibility that any moisture contained in the insulating paper may accelerate deterioration of the electric properties of the cable. In the case of the superconducting cable, the dielectric layer can be evacuated when the thermal insulation pipe is evacuated in the manufacturing process. However, in the event that the insulating layer is opened to the atmosphere in a terminal-end treatment of the cable, moisture is entrained into a surface of the dielectric layer 109, resulting in that the surface of the dielectric layer 109 has a moisture content of approximately 5,000 ppm. Even after the cable is laid, an inner surface of the corrugated tube 103 and the entire cable core 101 of the cable are often put in the moisture absorption state.

When the cooling of the superconducting cable line is started in the condition that the surface of the dielectric layer is in the moisture entrained state, the entrained moistures are cooled and solidified by the coolant, leading to a possible problem that the ices or solidified moistures may be clogged at the terminal end portion of the cable line.

When the operation of the superconducting cable line 15 is started, the moistures from the dielectric layer of the cable core 101 and others are cooled by the coolant, so that the moistures cooled are condensed or solidified in a sherbet-ice-like form or a granular form. Then, the nitrogen gas and others evaporating and flowing in sequence through the cable line try to carry those solidified moistures toward the discharge port B and discharge them out together from the discharge port B.

It is usual that the return pipe 19 has an inner diameter as narrow as approximately 20 mm and also is turned at a right angle or at a nearly right angle. Due to this, the ices or the moistures solidified in a sherbet-ice-like form or a granular form are easily congested around the joint 21C (viewed in FIG. 5) between the branch pipe 21 and the return pipe 19 in the cable line at the discharge side thereof (at the right-hand side as viewed in FIG. 4). This congestion of the ices or the solidified moistures may cause clogging of the return pipe 19 or reduction of a section area of the clean inner tube 19C, to cause a possible failure to circulate the coolant and a possible failure to cool down the cable line.

It may be conceivable that the piping is heated from outside to melt the congested material, so as to remove it. But, even when the return pipe and the branch pipe are heated from the outside, since those pipes are thermally insulated by evacuation, the heat is not transferred to the inside of those pipes with ease, so it is very difficult to melt the congested material by heating the piping from the outside. Additionally, once the return pipe and the branch pipe are heated, it requires a long time to restore those pipes to their former state, thus causing great losses in time and economic aspect.

It is a principal object of the present invention to provide a cooling method of a superconducting cable line wherein moistures contained in a cable housed in the superconducting cable line after set in are removed from the cable before cooling, to prevent the moistures from being solidified, so as to prevent a coolant flow channel and piping, such as a return pipe, from being clogged with the solidified moistures.

DISCLOSURE OF INVENTION

According to the present invention, the object noted above is accomplished in the method wherein gas is blown through the superconducting cable line to heat an interior of the cable line before cooling the superconducting cable line.

The present invention provides a cooling method of a superconducting cable line comprising a pretreatment for cooling that after a superconducting cable is laid and before a coolant is flown into the cable line, an inert gas is blown throughout the cable line, to discharge moistures contained in the cable line from the cable line.

According to the present invention, before the start of cooling of the superconducting cable line after laid, an inert gas is blown through the superconducting cable line so that moistures contained or entrained in the surface of the dielectric layer of the superconducting cable can be discharged together with the gas, to prevent the flow channel and the return pipe from being clogged. According to the present invention, after laying the superconducting cable, rather than when manufacturing the superconducting cable, the moistures contained in the dielectric layer and others of the cable, which produce harmful effects in the circulation of the coolant, are removed from the dielectric layer and others of the cable in the installation mode of the superconducting cable line in the manner described above.

In the following, the present invention will be described in detail.

The inert gas used in the present invention is preferably preheated to an extent to which the moistures are hardly turned into a solid state and also the insulation performance of the dielectric layer is not damaged. Specifically, it is preferable that the inert gas is preheated to a temperature of not higher than a permissible temperature of the insulating material. The preheating of the inert gas can facilitate vaporization of the moistures contained in the dielectric layer and others so that the moistures can be discharged together with the gas with ease. As a result of this, the time required for the removal of the moistures can be shortened to produce improved workability. It is preferable that the preheating temperature for the dielectric layer of the superconducting cable formed from e.g. polypropylene laminate paper is of not higher than 130° C., or preferably not higher than 80° C. It is preferable, on the other hand, that the preheating temperature for the dielectric layer formed from e.g. insulating paper is of not higher than 80° C. Inexpensive nitrogen gas is preferably used as the inert gas.

It is preferable that the superconducting cable line has the structure capable of controlling the temperature of the inert gas to be blown. Also, it is preferable that the moistures discharged are measured so that a content of moistures discharged, in other words, a content of moistures contained in the superconducting cable forming the superconducting cable line, can be grasped. Specifically, the inert gas is blown into the cable line from an inert gas feeding device including an inert gas generator or vessel, heating means of the inert gas and inert gas temperature measuring means. When the inert gas blown into the cable line is discharged from the other end of the cable line, the moistures contained in the inert gas discharged are measured thereat. The inert gas generator used includes, for example, a heater having the capability of temperature control used as the heating means, and a gas temperature gauge used as the temperature measuring means used for grasping the gas temperature. In this inert gas generator, a desirable temperature may be preset by the heater, while also temperature may be monitored by the gas temperature gauge, for a feedback control. Also, the moisture content may be measured by a moisture measuring device provided at the discharge side of the superconducting cable at which the moisture content is maximized, e.g., in the discharge pipe of the return pipe.

The inert gas generator or vessel that may be used include a gas bottle containing the inert gas or a gas bottle containing inert liquid from which the gas is taken out. A commercially available cold-converter is preferably used as the latter. The cold-converter is preferably used in that a larger amount of gas can be taken out at a time from the cold-converter than from the gas bottle containing dry gas. The gas may be taken out from the inert liquid in the cold-converter by using an evaporator or the gas stored in the bottle may be taken out directly from the gas discharge port of the gas bottle without using the evaporator.

It is preferable that after the preparation for cooling is performed and in turn the evacuation of the superconducting cable is performed, the coolant is flown into the cable line until the cable line is filled with the coolant. Although the moistures existing on the surfaces of the dielectric layer and other layers of the superconducting cable can be removed in the preparation for cooling, when the evacuation is combined with the preparation for cooling, the moistures existing in the inside of the dielectric layer and other layers can be removed with further reliability and efficiency. It is conceivable that the moistures in the superconducting cable line are removed simply by the evacuation. However, since some of the superconducting cables have a length as long as about 400-500 m between their joints and since the moistures existing in the inside of the dielectric layer and other layers are gradually moved to their surfaces, while being sequentially evaporated by the evacuation, it takes a lot of time to discharge or remove the moistures in the superconducting cable line by the evacuation only. Accordingly, in the present invention, the preparation for cooling and the evacuation are used in combination. When the preparation for cooling and the evacuation are repeatedly performed more than once, the moistures in the superconducting cable line can be removed with further reliability and efficiency.

It is desirable that the inert gas, such as nitrogen gas, is continuously blown through the cable line until the dielectric layer and others of the superconducting cable have a moisture content of not more than 3,000 ppm, or preferably not more than 1,800 ppm. The inventors' study indicates that with the moisture content at the discharge end decreased to not more than a specific moisture content by the moisture removal process, there is almost no possibility that a circulation cooling failure may be caused by the clogging of the piping or by the reduction in section area of the flow channel and in flow rate of the circulated coolant may be caused, even when the superconducting cable line is cooled by the coolant such as the liquid nitrogen.

BEST MODE FOR CARRYING OUT THE INVENTION

In the following, an embodiment of the present invention will be described.

Figure 1:
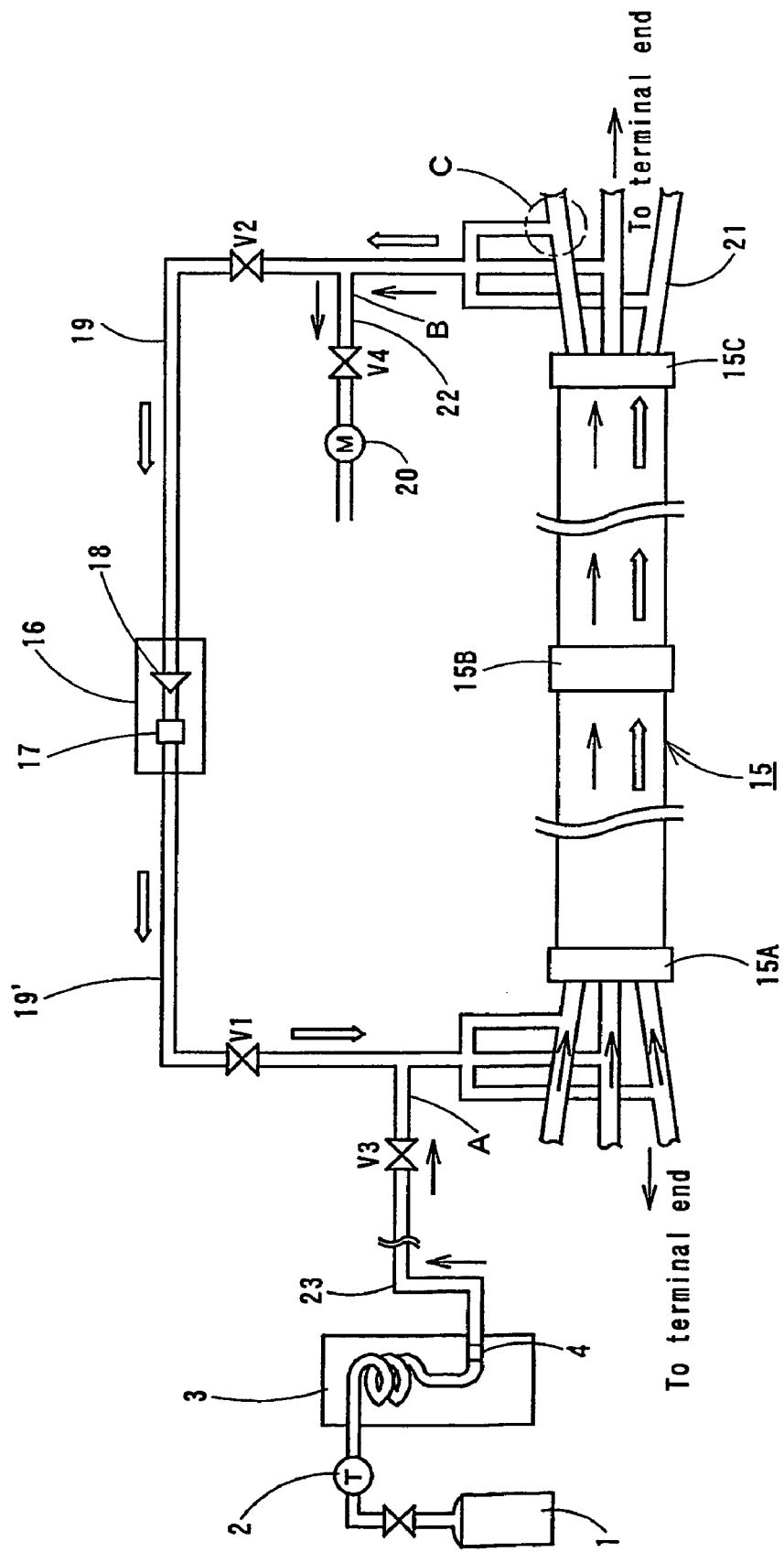
FIG. 1 is a schematic diagram showing a cooling method of the superconducting cable line of the present invention.
Figure 2:
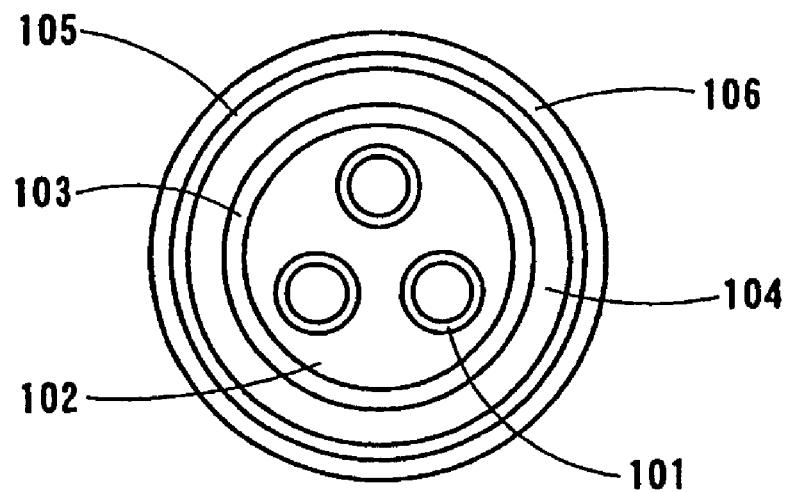
FIG. 2 is a structural drawing in section of an example of a cold-dielectric type superconducting cable having three twisted cable cores.
Figure 3:
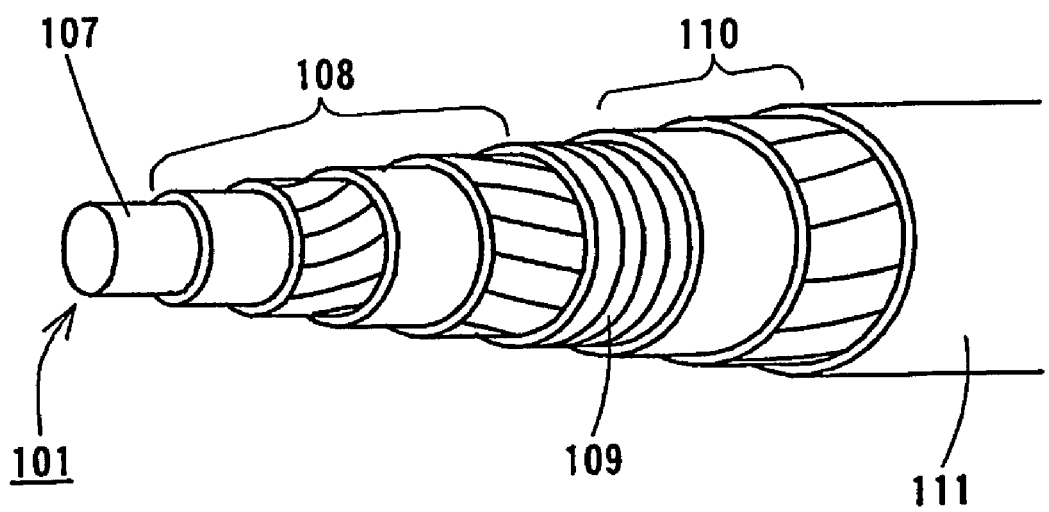
FIG. 3 is a perspective view of a cable core of the superconducting cable shown in FIG. 2.
Figure 4:
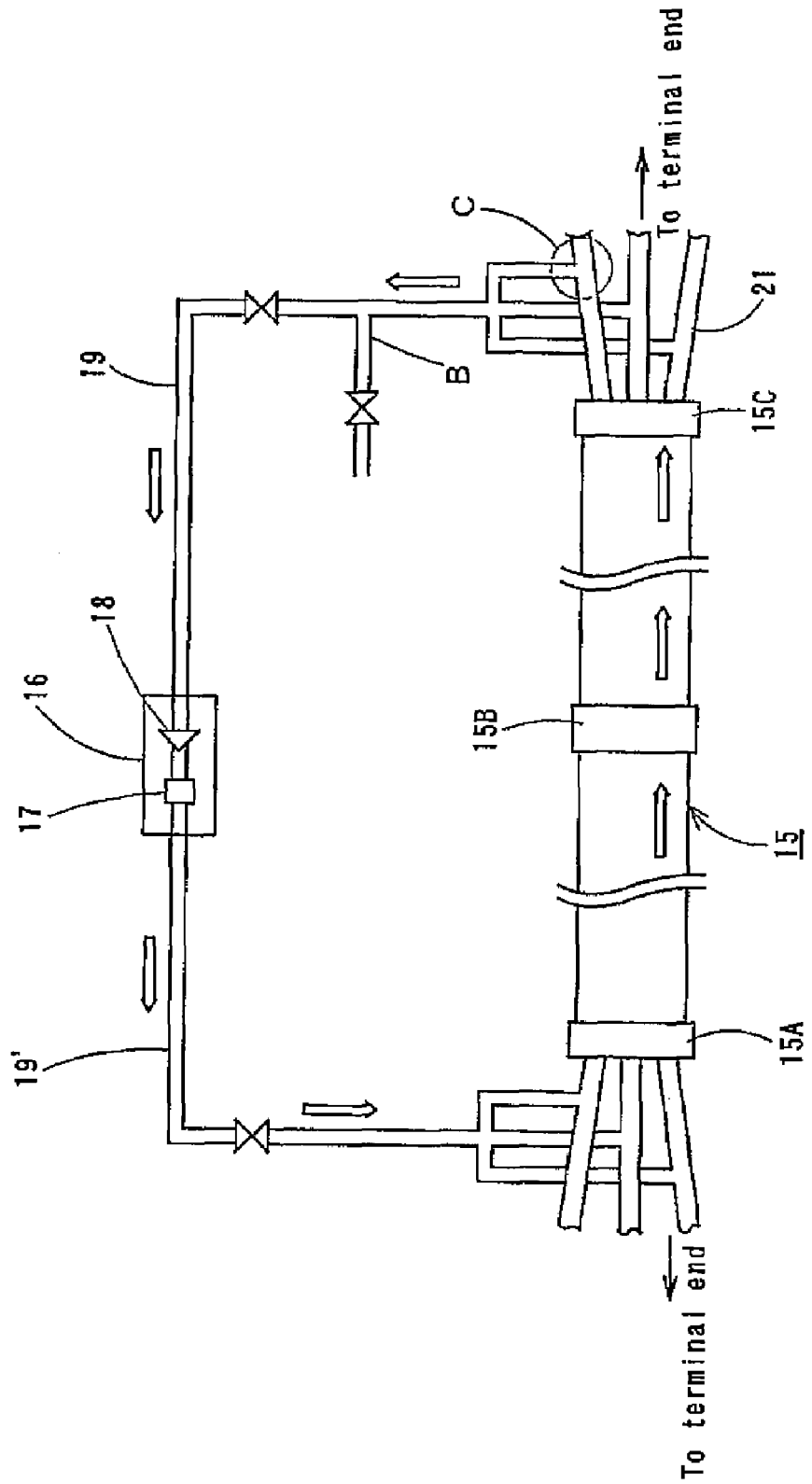
FIG. 4 is a schematic diagram of a conventional superconducting cable line.
Figure 5:
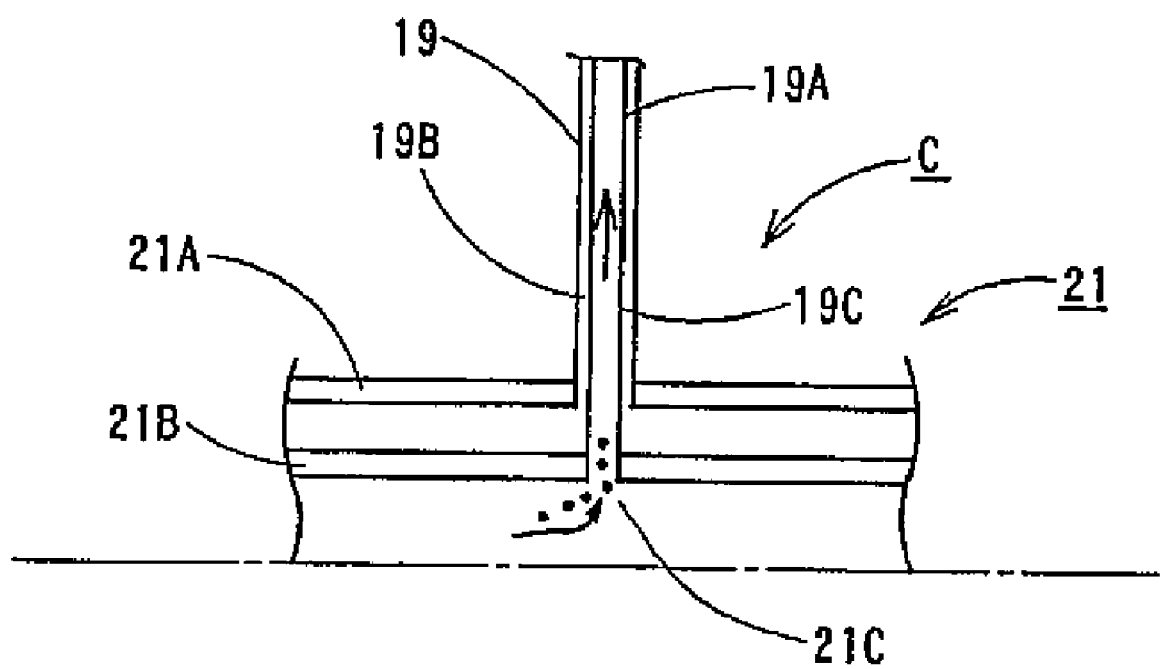
FIG. 5 is an enlarged illustration of a part C of FIG. 4.

FIG. 1 is a schematic diagram showing a cooling method of the superconducting cable line. The basic construction of the superconducting cable line is the same as that of the conventional superconducting cable line shown in FIG. 4. In the present invention, the superconducting cable line is equipped with the inert gas generating vessel, so that before the coolant is flown into the superconducting cable line 15, the inert gas is blown through the cable line 15 from an inflow pipe 23 connected to the supply pipe 19' to discharge the moistures in the cable line 15 together with the gas from the discharge pipe 22. In the following, reference will be made of the present invention, focusing on the construction to discharge the moistures contained in the superconducting cable line 15.

As illustrated in FIG. 1, the superconducting cable line 15 is provided with a nitrogen gas generating vessel 1 and a heater 3 at an inlet side A (at the left-hand side as viewed in FIG. 1). In the illustrated embodiment, a transportable cold-converter conveniently used at a job site is used as the nitrogen gas generating vessel 1. The nitrogen gas generating vessel 1 is provided with a gas flowmeter 2 at a location in the vicinity of an outlet of the nitrogen gas generating vessel 1. As the gas flowmeter 2 is used for monitoring a gas volume blowing through the cable line, the gas flowmeter 2 may be provided at a discharge side B. The heater 3 has the capability of controlling a heating temperature. Also, the heater 3 is equipped with a gas temperature gauge 4 at a location in the vicinity of the outlet of the heater 3, for monitoring the temperature of the supplied gas. The heater 3 is connected to the inflow pipe 23 through which the nitrogen gas heated to a certain temperature is blown through the superconducting cable line 15. The discharge pipe 22 connected to the return pipe 19 at a discharge side B is equipped with a moisture measuring instrument 20 to measure a moisture content of the discharged gas.

In the illustrated embodiment, the removal of the moistures contained in the superconducting cable line 15 is carried out in the condition in which the cooling device 16 is disconnected from the superconducting cable line. Specifically, a valve V1 in the supply pipe 19' and a valve V2 in the return pipe 19 are both closed, while on the other hand, a valve V3 in the inflow pipe 23 and a valve V4 in the discharge pipe 22 are both opened. Then, the inert gas is flown into the superconducting cable line 15 from the nitrogen gas generating vessel 1 and is blown off from the discharge port B side, whereby the moistures in the superconducting cable line 15 are removed from the circuit to discharge the inert gas. The cooling device 16 including a refrigerator 17 and a circulation pump 18 is formed as a unit so that evacuation and deaeration can be performed with ease. The cooling device 16 thus unitized can facilitate the removal of the moistures, and as such can allow separation of the circuitry from the cooling device 16, as illustrated in this embodiment.

In FIG. 1, black arrows indicate the flowing direction of the nitrogen gas. As described above, after the superconducting cable is laid to form the superconducting cable line 15, the inert gas is blown through the cable line 15 to remove the moistures contained in the cable line 15 before the coolant is flown into the cable line 15.

(1) First, the nitrogen gas is taken out from the nitrogen gas generating vessel 1 and then is fed into the heater 3 through the gas flowmeter 2.

The gas fed into the superconducting cable line is heated by the heater 3 to a temperature that does not affect on the insulating material of the superconducting cable. This is because a temperature of not lower than a normal temperature can shorten the time required for the removal of the moistures. Then, the gas is fed into the cable line, while measuring the temperature of the gas with the temperature measuring gauge 4. The gas volume of the nitrogen gas blown in is in the approximate range of 1-3 liter/sec.

(2) The nitrogen gas exhausted from the heater 3 is fed into the superconducting cable line 15 through the valve 3.

(3) The nitrogen gas passing through the superconducting cable line 15 passes through the return pipe 19 and the discharge pipe 22 and is discharged out together with the moistures contained in the cable line 15.

During this process, the nitrogen gas is blown off, while monitoring the moisture content of the discharged gas with the moisture measuring instrument 20.

(4) After the moistures in the cable line 15 are removed by blowing the inert gas through the superconducting cable line 15, the blowing of the inert gas is stopped. Then, the coolant is fed into the cable line and is circulated for cooling in a closed loop system of superconducting cable line→return pipe→cooling device→superconducting cable line, in the same manner as the conventional manner.

The removal of the moistures is stopped when the moisture content of the discharged nitrogen gas measured with the moisture measuring device 20 comes to be 3,000 ppm or less.

Further, the preparation process wherein the moistures contained in the superconducting cable line are removed by blowing the inert gas through the cable line may be combined with the evacuation process. In this combined process, it is preferable that the evacuation for a short time and the blowing of the inert gas are repeatedly performed several times. The evacuation may be performed by connecting an evacuation device to the inflow pipe 23 as an alternative to connecting the nitrogen gas generating vessel 1 and the heater 3 thereto.

INDUSTRIAL APPLICABILITY

As described above, according to the cooling method of the superconducting cable line of the present invention, after the superconducting cable line is laid and before the start of the flowing of the coolant through the superconducting cable line, the inert gas is blown through the cable line to remove the moistures contained in the cable line, so as to prevent the clogging of the piping with the coolant, and the reduction in section area of the flow channel and in the flow rate of the circulated coolant. This can prevent the failure of circulated cooling and the deterioration of cooling performance to thereby produce an improved performance of the superconducting cable line.

The invention claimed is:

1. A cooling method of a superconducting cable line comprising, a preparation process for cooling the superconducting cable, after a superconducting cable is laid and before a coolant is flown into the cable line, the preparation process comprising, providing a heated inert gas that is heated to a temperature no higher than a tolerance temperature for the insulating material, blowing the heated inert gas through the cable line, until the inert gas discharged from the cable line has a moisture content of no more than 3,000 ppm.

2. The cooling method of the superconducting cable line according to claim 1, wherein the inert gas is nitrogen gas.

3. The cooling method of the superconducting cable line according to claim 1, wherein after the superconducting cable is laid, the preparation for cooling is performed and in turn evacuation of the superconducting cable is performed and, thereafter, the coolant is flown into the cable line until the cable line is filled with the coolant.

4. The cooling method of the superconducting cable line according to claim 3, wherein the preparation for cooling and the evacuation are repeatedly performed more than once.

5. The cooling method of the superconducting cable line according to claim 1, wherein the heated inert gas is continuously blown through the cable line until the moisture content is not more than 1800 ppm.

6. The cooling method of the superconducting cable line according to claim 1, wherein the heated inert gas is heated no higher that 130° C.

7. The cooling method of the superconducting cable line according to claim 1, further comprising, flowing the coolant through the superconducting cable line after the preparation process;
wherein the coolant lowers the temperature of the superconducting cable line to a temperature to reach a superconductive level of conductivity.

8. The cooling method of the superconducting cable line according to claim 1, further comprising measuring the moisture content of the discharged gas.

9. The cooling method of the superconducting cable line according to claim 1, wherein the heated inert gas is heated before blowing.

10. The cooling method of the superconducting cable line according to claim 1, wherein the heated inert gas is heated without heating the super conducting cable.

11. A cooling method of a superconducting cable line comprising a preparation process for cooling a superconducting cable after the superconducting cable is laid and before a coolant is flown into the cable line, to discharge moisture contained in the cable line from the cable line;
wherein the inert gas is blown into the cable line from an inert gas feeding device including an inert gas generator or vessel, heating means to heat the inert gas, and inert gas temperature measuring means, whereby a moisture content of the inert gas discharged at an end of the cable line is measured.

* * * * *